July 15, 1941. G. HETTINGER 2,249,359
INSECTICIDE SPRAYING DEVICE
Filed July 20, 1938 2 Sheets-Sheet 1
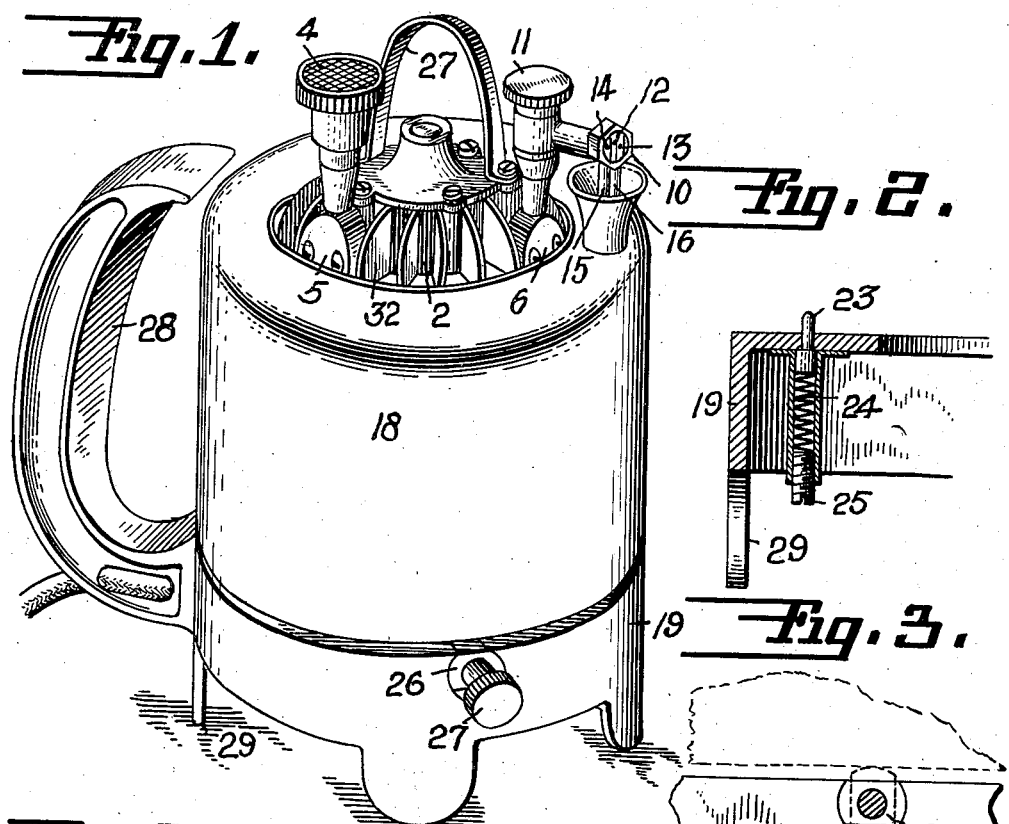
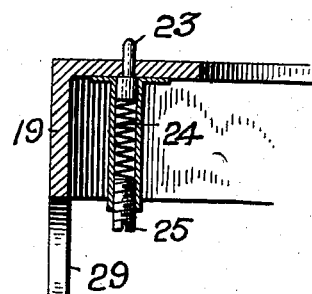
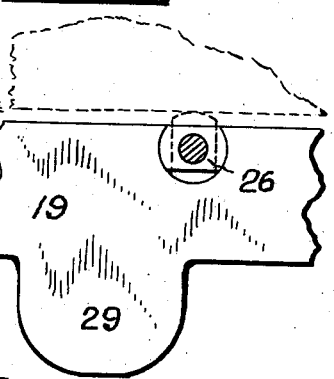
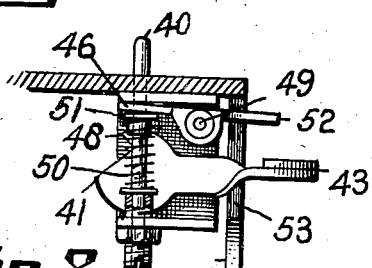
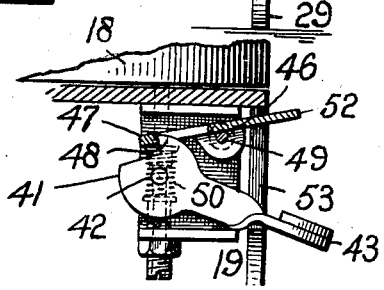
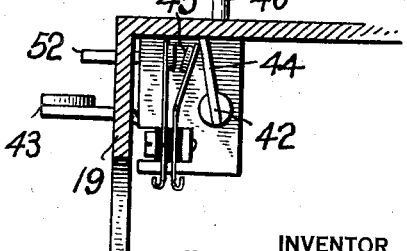
INVENTOR
George Hettinger
BY
Herbert H. Thompson
HIS ATTORNEY July 15, 1941.  G. HETTINGER  2,249,359
INSECTICIDE SPRAYING DEVICE
Filed July 20, 1938      2 Sheets-Sheet 2
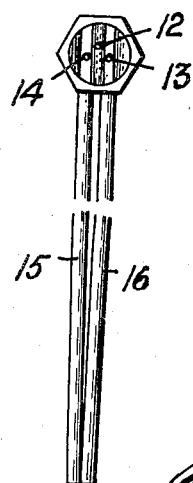
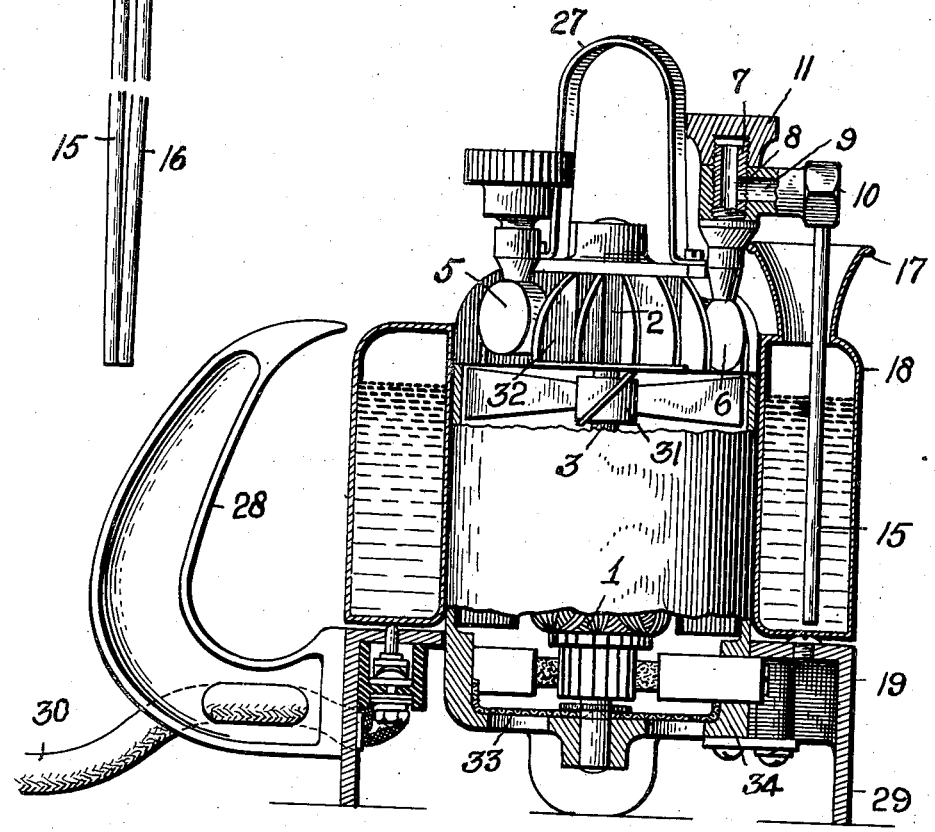
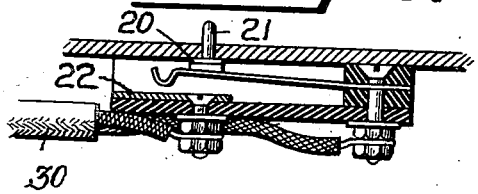
INVENTOR
George Hettinger
BY
Herbert H. Thompson
HIS ATTORNEY Patented July 15, 1941

2,249,359

UNITED STATES PATENT OFFICE 2,249,359

INSECTICIDE SPRAYING DEVICE

George Hettinger, East Rutherford, N. J., assignor to Du-La Manufacturing Company, a corporation of New York Application July 20, 1938, Serial No. 220,179

10 Claims. (Cl. 299—88)

My invention relates to insecticide spraying apparatus and particularly concerns a device of this character, which employs a motor driven air pump by means of which compressed air is forced from a nozzle, the position of which is such that the movement of the air draws the insecticide into its path from a juxtaposed tube, and vaporizes, or sprays, the same in a desired direction. The apparatus is preferably used indoors for the purpose of killing insects, although, obviously, it may be employed wherever similar results are required. An insecticide spraying device of this type is shown in my prior Patent 2,113,985, dated April 12, 1938.

This invention constitutes an improvement in this type of vaporizer. One of the improvements effected lies in constructing the container for the insecticide in the form of a hollow cylinder or annulus which normally surrounds the motor driven pump. By this construction not only is a more compact and sightly device secured but the motor driven pump is cooled by the liquid in the surrounding container and at the same time the said liquid warmed by the motor and pump, so that better vaporizing is secured.

Another improvement lies in making the spray outlet nozzle member on top readily removable so that repairs can be made on the top, nozzle and spout without taking the entire machine apart. Other improvements and objects of the invention will become apparent from the following description.

Referring to the drawings showing a preferred form of my invention:

Fig. 1 is a perspective view of my complete spray device.

Fig. 2 is a detail of a spring-pressed plunger used in the base.

Fig. 3 is a detail showing the cam for raising the container and stopping the motor at will.

Fig. 4 is a vertical section of my complete device, parts being shown in elevation.

Fig. 5 is a front elevation of the removable nozzle member.

Fig. 6 is a detail of the automatic switch in the base which starts and stops the motor.

Fig. 7 is a detail of the preferred form of the spring pressed switch for the motor.

Fig. 8 shows the same in the operative position.

Fig. 9 is a view of the same from the rear, showing the biased contacts.

My device comprises essentially an electric motor 1 for supplying the power for driving and air pump 2 which is preferably of the rotary vane type and is shown as mounted on the motor shaft 3. Preferably the motor is mounted on base 19 with its shaft vertical, the pump being secured in the top of the motor shell, which is preferably of cylindrical shape. Said base is in the form of a hollow ring having downwardly extending feet 29 and through the middle of which the bottom of the motor projects.

The motor shaft 3 is preferably provided with a cooling or ventilating fan 31 which pulls air downwardly over the cooling ribs 32 on the pump 2 and down past the motor armature and field coils and out through screened apertures 33 in the bearing cap 34. The pump may be of a type similar to a type shown in my prior patent in which the intake air is drawn through a screened opening 4 preferably provided with a felt disk soaked in oil to supply oil vapor to the pump for assisting in lubricating the same.

The air passes downwardly into the pump at 5, emerges at the opposite side at 6, then passes upwardly into the threaded small pipe 7. Said pipe is provided with a lateral opening 8 normally registering with the lateral passage 9 in the vaporizing or aspirating nozzle member 10. Said member may readily be removed from the vaporizer by taking off the cap 11 normally threaded on the end of pipe 7. The vaporizing head when detached is shown in Fig. 5. The head itself is shown as provided with a single air nozzle or aperture 12 and also with a pair of liquid spraying nozzles 13 and 14 tapped into small downwardly extending tubes 15 and 16, extending through the filling funnel or mouth 17 of the container for the liquid.

It should be noted that I place the air outlet 12 above and preferably between the two liquid outlets 13 and 14. This has the advantage that the mist is carried out with the air and does not drop near the nozzle. The tubes 15 and 16 are readily removable so as to be replaced by tubes having different size apertures, so that the spray density may be varied at will. Said funnel is shown as made considerably larger than the pipe 15, 16 so that the container 18 may be refilled without removing the spraying head or any other part of the device.

Liquid container 18 is shown as a hollow cylindrical member the inner walls of which closely fit the outer cylindrical or annular walls of the motor 1 and pump 2. Chamber 18 may be readily lifted off the base 19 of the motor for cleaning or repair after head 10 has been removed. In said base I provide a spring switch 20 normally biased to its open position and having a pin 21 extending through the base adapted to be engaged by the base of the container 18 so that when the container has liquid therein the switch arm 20 is pressed against the fixed contact 22. When however the container is about empty the weight thereof is insufficient to hold the switch closed, the contact opens and stops the motor automatically.

In case the spring of the switch 20 is insufficient to support the weight of the empty container I may provide in addition a spring-pressed button 23 to support the main weight of the empty container. The compression of the spring 24 may be adjusted by setting a screw 25 so that the button and switch will lift the container and open the switch, just as soon as the liquid level falls to a point requiring refilling.

Preferably I also provide a cam 26 in the base turned by a button 27. In the normal position the top of the cam is flush with the top of the base but when turned to the position shown in Fig. 3 the cam lifts the container 18 to open the switch and stop the motor.

The pump may be provided with a handle or finger hold 21 and also a laterally extending handle 28 may be provided secured only at its base to base 19 which supports the motor. The electric cord 30 is shown as entering the device through a bore in the bottom of handle 28, the wires passing to the switch and to the motor in the well known manner. Handle 28 extends preferably to a point adjacent the top of the container 18, but is spaced therefrom so that the container may be lifted from the base and removed from the motor.

The preferred form of switch, however, is shown in Figs. 7, 8 and 9. According to this form, there is mounted adjacent the spring pressed plunger 40 a contact arm 41 pivoted by means of shaft 42 and having a finger piece 43 thereon extending through a slot 53 in base 19. Said shaft 42 is provided with a lateral extension 44 which engages one of the spring biased contacts 45, so that when said arm is depressed by the finger, said contacts are closed. Above said arm is provided a pivoted latch 46 having a cut-out portion to provide a cross bar 47 which is adapted to engage a lip 48 on arm 41, when said arm is depressed, thereby holding the arm in its downward position and the contacts closed as shown in Fig. 8. Said latch is normally weighted to the left of its pivot 49, so that it will fall down and engage said lip whenever the plunger 40 is depressed against the compression spring 50 by a sufficient quantity of liquid in the container 18. When, however, there is an insufficient quantity of liquid in the container, a collar 51 on said plunger engages the under surface of said latch and raises the same to disengage the catch so as to release the switch. The latch 46 is also provided with a finger piece 52 extending beyond base 19 through slot 53, so that by pressing downwardly on the same, the latch may be disengaged from the catch and the switch opened even though the container be full. With this arrangement, the cam 26 is unnecessary, since the switch is under the complete control of the operator even though the container be full. If, for instance, a full container is placed on the base, the motor will not be started until the finger piece 43 is depressed. Even after starting, the motor may be stopped at any time by pressing the finger piece 52. On the other hand, the motor will not remain running when the container is empty, since as soon as the finger is removed from piece 43, biased contacts 45 open and stop the motor.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a motor driven insecticide sprayer, an electric motor-pump having a cylindrical shell, a base therefor, supporting said shell in a vertical position, a separable annular container for the insecticide having spaced inner and outer walls, the former being adapted to closely fit over said shell, said container resting on said base and enclosing the greater portion of said motor, and an aspirating head having an air connection with said pump and a tube removably extending within said container.

2. In a motor driven insecticide sprayer, an electric motor having a cylindrical shell, a base therefor, supporting said motor in a vertical position, a rotary pump secured in the upper part of said shell, and having cooling ribs thereon, a separable annular container for the insecticide having spaced inner and outer walls, the former being adapted to closely fit over said shell and rest on said base, said ribs projecting above said container, and a fan on the motor shaft within said shell for causing air flow over said ribs and through the motor.

3. In a motor driven insecticide sprayer, an electric motor-pump having a substantially cylindrical shell, a base therefor, supporting said shell in a vertical position, a hollow annular container for the insecticide having spaced inner and outer walls, the former being adapted to closely fit over said shell to enclose the same, said container being adapted to rest on said base, a switch in said base for operating said motor, a spring pressed member adapted to support the weight of said container when approximately empty, but the added weight of the liquid serving to depress said member and maintain said switch closed.

4. In a motor driven insecticide sprayer, an electric motor-pump having a cylindrical shell, a base therefor, supporting said shell in a vertical position, a hollow annular container for the insecticide having spaced inner and outer walls, the former being adapted to closely fit over said shell to enclose the same, said container being adapted to rest on said base, a detachable head having an air connection with said pump and a tube extending within said container, and a handle secured at its bottom to said base and extending upwardly to adjacent the top of said container, but spaced therefrom, so that said container may be lifted from the base and removed from the motor.

5. A motor driven insecticide as claimed in claim 1 in which said aspirating head is detachable or replaceable, whereby different concentrations of spray may be secured.

6. In a motor driven insecticide sprayer, an electric motor-pump having a cylindrical shell, a base therefor, supporting said shell in a vertical position, a hollow annular container for the insecticide having spaced inner and outer walls, the former being adapted to closely fit over said shell to enclose the same, said container being adapted to rest on said base, and a spring switching means in the base of said motor normally biased to the open position and adapted to support the weight of said container when approximately empty, but the added weight of the liquid serving to depress said means and maintain said switch closed.

7. In a motor driven insecticide sprayer having an air pump, an electric motor for driving said pump, an insecticide container, and means comprising a tube for conveying the insecticide from said container into the air stream issuing from the pump, of a spring operated electric switch for controlling the operation of the motor comprising a spring pressed plunger on which said container normally rests, a normally open switch arm, a finger piece thereon for closing said switch, a latch holding said switch closed, means on said plunger engaging said latch to release same when the weight of said container and its contents is insufficient to hold said plunger down, and a finger piece on said switch whereby said latch may be tripped manually to open the switch even though said container may have a substantial quantity of liquid therein.

8. In a motor driven sprayer having a container for the liquid, of a spring pressed plunger on which said container normally rests, a switch arm normally biased to the open position, a latch for holding said switch closed, means on said plunger engaging said latch to release the same as the plunger rises, finger holds on both said latch and arm whereby the motor is only started when said container contains a predetermined quantity of liquid and said arm is depressed, and said motor may be stopped by pressing said latch even while said container still contains the same quantity of liquid.

9. In a motor driven insecticide sprayer, an electric motor-pump having a cylindrical shell, a base therefor supporting said shell in a vertical position, a hollow annular container for the insecticide adapted to fit over said shell and rest on said base, a spring switching means in the base of said motor normally biased to the open position and adapted to support the weight of said container when approximately empty, but the added weight of the liquid serving to depress said means and maintain said switch closed, and a knob for raising said container to prevent the closing of said switch.

10. In a motor driven insecticide sprayer having an air pump, an electric motor for driving said pump, an insecticide container, and means comprising a tube for conveying the insecticide from said container into the air stream issuing from the pump, of a spring operated electric switch for controlling the operation of the motor comprising a spring pressed plunger on which said container normally rests, a normally open switch arm, a finger piece thereon for closing said switch, a latch holding said switch closed, means on said plunger engaging said latch to release same when the weight of said container and its contents is insufficient to hold said plunger down, and a knob for slightly raising said container to prevent the closing of said switch.

GEORGE HETTINGER.